June 14, 1955 V. C. WESTBERG ET AL 2,710,907
ENERGY TRANSFER UNIT
Filed Jan. 2, 1953 2 Sheets-Sheet 2
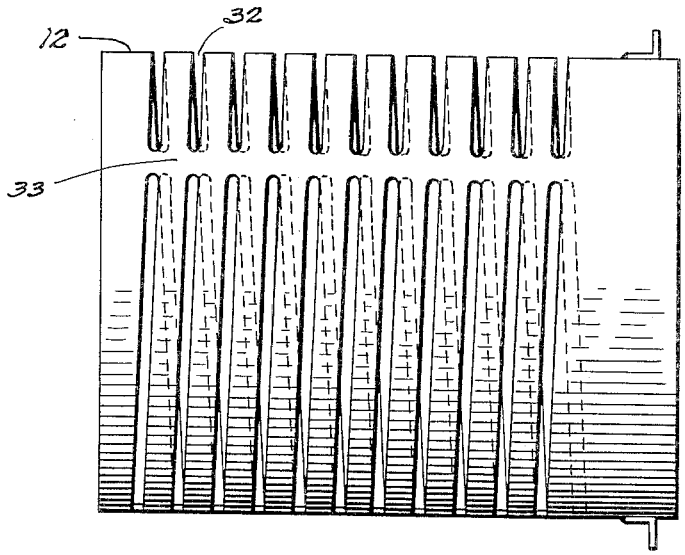
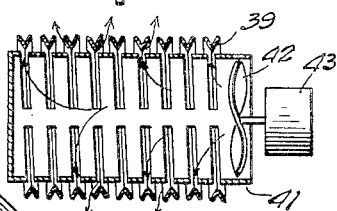
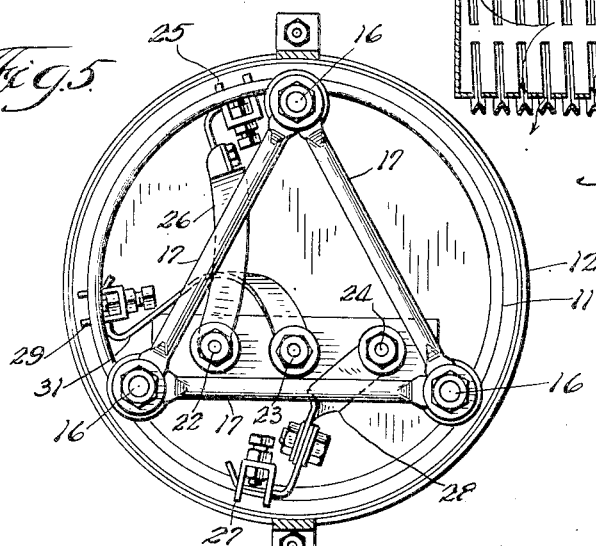
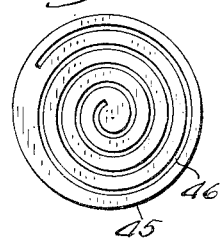
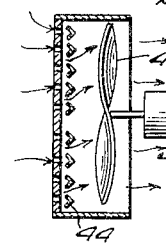
INVENTORS.
Vernon C. Westberg.
BY & James H. Nilson.
Thiess, Olson, Mecklenburger,
von Holst & Coltman.
Attys.

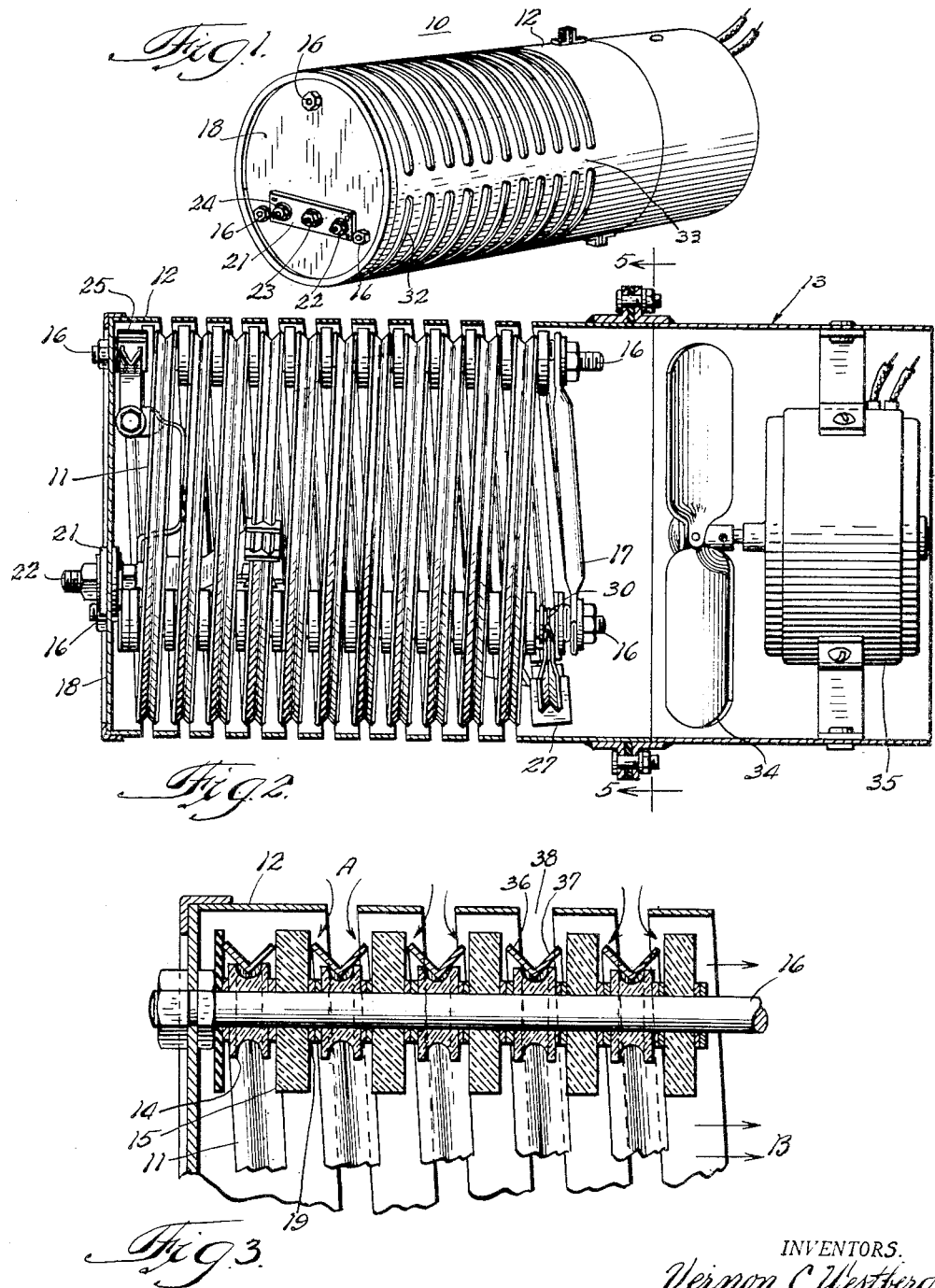

United States Patent Office 2,710,907
Patented June 14, 1955

2,710,907

ENERGY TRANSFER UNIT

Vernon C. Westberg, Arlington Heights, and James H. Nilson, Wilmette, Ill., assignors to Sun Electric Corporation, Chicago, Ill., a corporation of Delaware Application January 2, 1953, Serial No. 329,412

17 Claims. (Cl. 219—39)

This invention relates to energy transfer apparatus, more particularly, to heat transfer apparatus, and it is an object of the invention to provide improved apparatus of this character.

It is a further object of the invention to provide an improved heat transfer unit in which the heated element is electrically heated.

In the testing of electric generators, for example, it is customary to perform a load test during which the generator is made to supply its full load for a considerable length of time in order that its performance may be observed. This necessitates the provision of some form of electrical energy absorber or dissipator to receive the energy provided by the generator. In the commercial manufacture of generators, test facilities are easily provided even for relatively large generators. However, in the testing of generators which are already installed in other apparatus such, for example, as the generators driven by the engines in military tanks, a rather acute problem arises as to how to dissipate the energy delivered by the generator when it is being tested after repair, for example. The energy available is quite large and an ordinary dissipating unit would be quite large. However, the space available for repair apparatus and personnel in military tanks is very small. Consequently the energy dissipator must likewise be small. At the same time, it must be sufficiently well isolated that the repair personnel will not come into contact with hot conductors. Accordingly, it is a further object of the invention to provide an improved heat transfer unit of the character indicated which has a high capacity, is compact in size, light in weight and inexpensive to manufacture.

It is a further object of the invention to provide an improved heat transfer unit which may be used as an electrical energy absorber or dissipator, or as a space heater.

It is a further object of the invention to provide an improved heat transfer unit of the character indicated which is efficient in operation.

Further advantages and objects of the invention will become apparent as the description proceeds.

In carrying out the invention in one form, an energy transfer unit is provided comprising an elongated element of tortuous configuration for transferring energy, and a baffle disposed relatively close to the elongated element, the baffle including a slot of the same configuration as that of the elongated element. Each portion of the slot lies along a respective portion of the elongated element and is disposed to guide a fluid medium passing therethrough on to the respective portion of the elongated element, and means are provided for passing a fluid medium through the slot and past the elongated element.

For a more complete understanding of the invention, reference should be had to the accompanying drawings in which:

Figure 1 is a perspective view of an electrical energy absorber or dissipator embodying the invention.

Fig. 2 is a vertical elevational view partly in section of the apparatus shown in Fig. 1.

Fig. 3 is a fragmentary view in vertical section and on a larger scale of the apparatus shown in Fig. 2.

Fig. 4 is an elevational view of one portion of the apparatus embodying the invention.

Fig. 5 is a view taken substantially in the direction of arrows 5—5 of Fig. 2.

Fig. 6 is a schematic vertical sectional view of a modified form of apparatus embodying the invention.

Fig. 7 is an end view of another embodiment of the invention, and

Fig. 8 is a vertical sectional view of the apparatus shown in Fig. 7.

Referring to the drawings, the invention is shown embodied in an electrical energy absorber or dissipator 10 comprising an electrical resistance unit 11, a baffle 12 surrounding the resistance unit 11 and a motor-driven fan assembly 13 for drawing air through the baffle, across the resistance unit and out.

The resistance unit 11 is formed as a spiral and particularly is a helix of the necessary diameter and number of convolutions to give the length of unit desired. Each convolution of the helix is supported at three points around the circumference by means of insulating washers 14 and 15 mounted on transverse rods 16, the transverse rods being held in spaced relationship at one end by means of three bars 17 arranged in the form of an equilateral triangle. At the other end the three bolts 16 are attached to a base plate 18. Other forms of mechanically supporting the helical resistance unit may, of course, be used.

The resistance unit is made of flat material bent into an angular cross section and the apex of the angle is disposed downwardly as may be seen best in Fig. 3, the apex fitting into the groove existing around the washers 14. The flat character of the resistance unit stock gives a large surface area across which cooling air may be passed.

The washers 15 separate the individual convolutions of the helix from each other and to give the necessary mechanical spacing, smaller washers 19 may be used between washers 14 and 15.

An insulating terminal board 21 is attached to the base plate 18, the terminal board serving to support terminals 22, 23 and 24 to which the beginning, some point along the length, and the end of the resistance unit are connected respectively. The beginning of the resistance unit is connected to terminal 22 by means of a suitable clamp 25 and a conducting strap 26. The end of the resistance unit is connected to the terminal 24 by means of a clamp 27 and a strap 28. The terminal 23 is connected to any desired point along the length of the resistance unit by a clamp 29 and a strap 31.

The angular cross section of the resistance unit makes it relatively rigid and when wrapped around a frame work, such as that formed of the rods 16, bars 17, base plate 18 and washers 14, 15 and 19, as shown, a rigid unit is provided which can stand a large amount of abuse. The resistance unit, when formed as described, retains its form without any substantial tendency to spring out of shape. Hence the resistance unit may be held to the frame, for example, by the clamp 25 and strap 26 at one end and by a wire 30 wrapped around the insulating washer and twisted, as shown, at the other end.

The baffle 12 in Fig. 2 is shown surrounding the helical resistance unit. The baffle 12 is provided with a spiral and, more particularly, a helical slot 32 in its surface, the helical slot having the same pitch as that of the helical resistance unit. The helical slot 32 extends along the surface of baffle 12 to the same height as that of the helical resistance unit 11 so that for every convolution of the helical resistance unit there is a corresponding convolution of the helical slot. The baffle 12 may be formed of relatively thin sheet metal with the slot 32 formed therein, and to provide the necessary supporting rigidity for the strip of metal between the slot convolutions, several longitudinal strips of metal 33, for example three, may be provided around the circumference. While the strips of metal 33 are present, they do not disturb the helical character of the slot and they are of relatively narrow widths in order not to disturb the flow of cooling air for example.

It is an important aspect of the present invention that each convolution of the spiral slot 32 is disposed relative to a respective convolution of the helical resistance unit 11 so that air, for example, if this is the heat transfer medium, in passing through the convolutions of the helical slot impinges directly upon the respective convolutions of the helical resistance unit. There must be provided a convolution of the helical slot for each convolution of the helical resistance unit and each slot must be so disposed that air after first passing through it thereafter impinges directly upon the respective convolution of the helical resistance unit.

Referring particularly to Figs. 2 and 3 in which the baffle 12 is shown surrounding the helical resistance unit 11, the convolutions of the helical slot are disposed radially outwardly of the respective convolutions of the helical resistance unit. Each convolution of the helical slot is, in effect, concentric with a respective convolution of the helical resistance unit. By virtue of this structure air, which is drawn into the unit, first passes through the convolutions of the helical slot and the air which passes through a particular convolution of the helical slot impinges directly upon the respective convolution of the helical resistance unit. The direction of flow of air may be, for example, as shown by the arrows in Fig. 3. The base plate 18 prevents air from entering through the end of the unit.

The motor fan unit 13 is disposed at the end of the unit opposite to the base plate 18 and is adapted to draw air through the convolutions of the helical slot 32 and past the convolutions of the helical resistance unit 11, as shown by the arrows A in Fig. 3, and outwardly of the unit as shown by the arrows B.

The motor fan unit may be attached to the baffle 12 in any desired manner as by bolts, as shown, and comprises a fan 34 which may be driven by an electric motor 35, the direction of rotation being as shown in Fig. 2 so that air is drawn through the unit as shown by the arrows A and B in Fig. 3.

It will be observed that with the construction as shown and described, air at ambient temperature is drawn through each convolution of the helical slot 32 and thus each convolution of the helical resistance unit 11 receives air at the same temperature. Accordingly, each convolution of the helical resistance unit is cooled by the same amount and all convolutions operate substantially at the same temperatures. Consequently, there are no hot spots in the resistance unit which would limit the amount of current which can flow through it and thus the capacity of the unit. Because the whole resistance unit operates at substantially the same temperature, the unit may be operated at high capacity. The diameter of the convolutions of the helical resistance unit is sufficiently large so that the fan 34 creates substantially the same pressure in the space within the helical resistance unit for each convolution thereof. Accordingly, each convolution receives substantially the same amount of cold air.

While the motor 35 is shown at the right hand end of the apparatus in Fig. 2 and consequently will be heated by the air drawn through the unit, it will be apparent to those skilled in the art that the motor 35 may be mounted at the opposite end of the unit with the fan 34 remaining in the position shown, in order that the cooling air may be drawn through the unit, as described.

In utilizing the device described for testing military tank generators, it is necessary only to connect the terminals of the generator to be tested to whichever two of the terminals 22, 23 and 24 which will provide the desired amount of resistance therebetween, the clamp 29 being disposed along the helical resistance unit at the point desired. Thereafter, the generator is operated and the energy delivered thereby passes into the helical resistance unit 11, causing it to become heated. The air drawn through the unit by the fan 34 then causes the resistance unit to become cooled and a balance is reached at which the resistance unit operates at the proper temperature. The heated air passing out at the right hand of the apparatus (Figs. 2 and 3) is, of course, passed into the atmosphere and is lost in the case of testing military tank generators, but it will be evident that this heated air can be used to heat any desired space so long as electrical energy is available for heating the resistance unit 11 and operating the electric motor 35.

The angular sides of each convolution of the helical resistance unit 11 are so disposed that heat energy from the exterior surfaces thereof is radiated through the respective convolution of the helical slot 32. Thus, referring to Fig. 3, for example, the energy available for radiation from the surfaces 36 and 37 is radiated outwardly through the slot convolution 38. The energy available for radiation from the rearward surfaces of convolution (36, 37) is radiated inwardly and tends to cause the unit to remain hot. However, a very substantial portion of the total energy available for radiation is radiated outwardly through slot convolutions. It is not essential that the angle between the surfaces, e. g. 36 and 37, be 90°, although it has been found that this is a satisfactory construction.

Accordingly, the unit is efficient from the standpoint of heat transfer by convection and by radiation, and an overall efficient unit is had since both types of heat transfer are utilized.

In Fig. 6 there is shown a modified form of the invention in which a helical heat transfer unit 39 is provided and a baffle 41 with a helical slot therein is disposed interiorly and concentric with the unit 39. The relative disposition of the convolutions of the helical heat transfer unit 39 and the helical slot in baffle 41 are as described with respect to the preceding modification. However, the fan 42 is driven by a motor 43 so that air is blown first through the convolutions of the slot in baffle 41 and then past the convolutions of the helical unit 39. Each convolution of the helical unit 39 is substantially concentric with the respective convolution of the helical slot, whereby each convolution of the helical unit 39 receives its own air through its respective convolution of the helical slot. The mechanical support of the elements shown in Fig. 6 with respect to each other may be substantially that shown in Figs. 2 and 3.

In Figs. 7 and 8 there is shown a further modification in which the energy or heat transfer unit 44 is essentially a planar spiral, and the baffle 45 disposed on one side thereof and relatively close thereto includes essentially a planar spiral groove 46. Each convolution of the spiral slot 46 lies longitudinally or axially spaced from the respective convolution of the spiral unit 44 so that the air passing through each convolution of the spiral slot 46 impinges directly on the respective convolution of the spiral unit 44. A fan 47 and a motor 48 are disposed to draw air through the spiral slot 45 and past the spiral unit 44.

While the invention has been described with respect to an electrically heated resistance unit across which air is drawn, it will be understood that the principles of the invention are applicable to the form of structure described irrespective of the nature of the energy involved or of the fluid used in its transfer. Other gases instead of air, and liquids could be used. Also, instead of providing a unit heated electrically, a unit could be provided which is heated by hot gases or liquids, for example, by circulating such heated fluids in a pipe of proper configuration and the fluid circulating in such a pipe could be a cooling fluid, if desired, all without departing from the spirit and scope of the invention.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. An energy transfer unit comprising a spiral element of angular cross section for transferring energy, a baffle disposed relatively close to said spiral element, said baffle having a spiral slot therein, each convolution of said spiral slot lying along a respective convolution of said spiral element and being disposed to guide fluid medium passing therethrough onto said respective convolution of said spiral element, and means for passing a fluid medium through the convolutions of said spiral slot and past the convolutions of said spiral element.

2. An energy transfer unit comprising a spiral element of angular cross section for transferring energy, a baffle disposed relatively close to said spiral element, said baffle having a spiral slot therein, each convolution of said spiral slot lying along a respective convolution of said spiral element and being disposed to guide fluid medium passing therethrough onto said respective convolution of said spiral element, and means for passing a fluid medium through the convolutions of said spiral slot and past the convolutions of said spiral element, the angular sides of said spiral element of each convolution thereof being disposed to radiate a substantial portion of the energy available for radiation through the respective one of the convolutions of said spiral slot.

3. An electrical energy transfer unit comprising a spiral element of angular cross section for transferring electrical energy, a baffle disposed relatively close to said element, said baffle having a spiral slot therein, each convolution of said spiral slot lying along a respective convolution of said spiral element and being disposed to guide fluid medium passing therethrough onto said respective convolution of said spiral element, and means for passing a fluid medium through the convolutions of said spiral slot and past the convolutions of said spiral element, the angular sides of said spiral element of each convolution thereof being disposed to radiate a substantial portion of the energy available for radiation through the respective one of the convolutions of said spiral slot.

4. An energy transfer unit comprising a helical element for transferring energy, a baffle concentric with said helical element and relatively close thereto, said baffle having a helical slot therein, each convolution of said helical slot being substantially concentric with a respective convolution of said helical element for guiding fluid medium passing therethrough onto said respective convolution of said helical element, and means for passing a fluid medium through the convolutions of said helical slot and past the convolutions of said helical element.

5. An energy transfer unit comprising a helical element of angular cross section for transferring energy, a baffle concentric with said helical element and relatively close thereto, said baffle having a helical slot therein, each convolution of said helical slot being substantially concentric with a respective convolution of said helical element for guiding fluid medium passing therethrough onto said respective convolution of said helical element, and means for passing a fluid medium through said helical slot and past said helical element.

6. An energy transfer unit comprising a helical element of angular cross section for transferring energy, a baffle concentric with said helical element and relatively close thereto, said baffle having a helical slot therein, each convolution of said helical slot being substantially concentric with a respective convolution of said helical element for guiding fluid medium passing therethrough onto said respective convolution of said helical element, and means for passing a fluid medium through the convolutions of said helical slot and past the convolutions of said helical element, the angular sides of said helical element of each convolution thereof being disposed to radiate a substantial portion of the energy available for radiation through the respective one of the convolutions of said helical slot.

7. An electrical energy transfer unit comprising a helical element for transferring electrical energy, a baffle disposed concentric with said helical element and relatively close thereto, said baffle having a helical slot therein, each convolution of said helical slot being substantially concentric with a respective convolution of said helical element for guiding fluid medium passing therethrough onto said respective convolution of said helical element, and means for passing a fluid medium through the convolutions of said helical slot and past the convolutions of said helical element.

8. An electrical energy transfer unit comprising a helical element of angular cross section for transferring electrical energy, a baffle concentric with said helical element and relatively close thereto, said baffle having a helical slot therein, each convolution of said helical slot being substantially concentric with a respective convolution of said helical element for guiding fluid medium passing therethrough onto said respective convolution of said helical element, and means for passing a fluid medium through the convolutions of said helical slot and past the convolutions of said helical element, the angular sides of said helical element of each convolution thereof being disposed to radiate a substantial portion of the energy available for radiation through the respective one of the convolutions of said helical element.

9. An energy transfer unit comprising a helical element for transferring energy, a baffle concentric with said helical element exteriorly thereof and relatively close thereto, said baffle having a helical slot therein, each convolution of said helical slot being substantially concentric with a respective convolution of said helical element for guiding fluid medium passing therethrough onto said respective convolution of said helical element, and means for passing a fluid medium through the convolutions of said helical slot and past the convolutions of said helical element.

10. An electrical energy transfer unit comprising a helical element for transferring energy, a baffle concentric with said helical element exteriorly thereof and relatively close thereto, said baffle having a helical slot therein, each convolution of said helical slot being substantially concentric with a respective convolution of said helical element for guiding fluid medium passing therethrough onto said respective convolution of said helical element, and means for passing a fluid medium through the convolutions of said helical slot and past the convolutions of said helical element.

11. An electrical energy transfer unit comprising a helical element of angular cross section for transferring energy, a baffle concentric with said helical element exteriorly thereof and relatively close thereto, said baffle having a helical slot therein, each convolution of said helical slot being substantially concentric with a respective convolution of said helical element for guiding air passing therethrough onto said respective convolution of said helical element, and means at one end of said baffle and helix for drawing air through the convolutions of said helical slot and past the convolutions of said helical element, the angular sides of said helical element of each convolution thereof being disposed to radiate a substantial portion of the energy available for radiation through the respective one of the convolutions of said helical slot.

12. An energy transfer unit comprising a helical element for transferring energy, a baffle concentric with said helical element interiorly thereof and relatively close thereto, said baffle having a helical slot therein, each convolution of said helical slot being substantially concentric with a respective convolution of said helical element for guiding fluid medium passing therethrough onto said respective convolution of said helical element, and means for passing a fluid medium through the convolutions of said helical slot and past the convolutions of the helical element.

13. An electrical energy transfer unit comprising a helical element of angular cross section for transferring electrical energy, a baffle concentric with said helical element interiorly thereof and relatively close thereto, said baffle having a helical slot therein, each convolution of said helical slot being substantially concentric with a respective convolution of said helical element for guiding fluid medium passing therethrough onto said respective convolution of said helical element, and means at one end of said baffle and helix for blowing air through the convolutions of said helical slot and past the convolutions of said helical element.

14. An electrical energy transfer unit comprising a helical element of angular cross section for transferring energy, a baffle concentric with said helical element interiorly thereof and relatively close thereto, said baffle having a helical slot therein, each convolution of said helical slot being substantially concentric with a respective convolution of said helical element for guiding air passing therethrough onto said respective convolution of said helical element, and means at one end of said baffle and helix for blowing air through the convolutions of said helical slot and past the convolutions of said helical element, the angular sides of said helical element of each convolution thereof being disposed to radiate a substantial portion of the energy available for radiation through the respective one of the convolutions of said helical slot.

15. An energy transfer unit comprising a planar spiral element of angular cross section for transferring energy, a planar baffle disposed relatively close to said spiral element, said baffle having a spiral slot therein, each convolution of said spiral slot lying along a respective convolution of said spiral element and being disposed to guide fluid medium passing therethrough onto said respective convolution of said spiral element, and means for passing a fluid medium through the convolutions of said spiral slot and past the convolutions of said spiral element.

16. An energy transfer unit comprising a planar spiral element of angular cross section for transferring energy, a planar baffle disposed relatively close to said spiral element, said baffle having a spiral slot therein, each convolution of said spiral slot lying along a respective convolution of said spiral element and being disposed to guide fluid medium passing therethrough onto said respective convolution of said spiral element, and means for passing a fluid medium through the convolutions of said spiral slot and past the convolutions of said spiral element, the angular sides of said spiral element of each convolution thereof being disposed to radiate a substantial portion of the energy available for radiation through the respective one of the convolutions of said spiral slot.

17. An electrical energy transfer unit comprising a planar spiral element of angular cross section for transferring electrical energy, a planar baffle disposed relatively close to said element at one side thereof, said baffle having a spiral slot therein, each convolution of said spiral slot lying along a respective convolution of said spiral element and being disposed to guide air passing therethrough onto said respective convolution of said spiral element, and means for drawing air through the convolutions of said spiral slot and past the convolutions of said spiral element, the angular sides of said spiral element of each convolution thereof being disposed to radiate a substantial portion of the energy available for radiation through the respective one of the convolutions of said spiral slot.

References Cited in the file of this patent

UNITED STATES PATENTS

| Number | Name | Date |
|---|---|---|
| 783,057 | Mahoney | Feb. 21, 1905 |
| 1,864,334 | Bailey | June 21, 1932 |
| 1,908,559 | Roser | May 9, 1933 |
| 1,942,758 | Jessup | Jan. 9, 1934 |
| 1,951,675 | Schlesinger | Mar. 20, 1934 |
| 2,217,296 | Shaw | Oct. 8, 1940 |
| 2,456,781 | Hardey | Dec. 21, 1948 |
| 2,491,399 | Thompson | Dec. 13, 1949 |